United States Patent
Layne

(10) Patent No.: US 8,113,334 B2
(45) Date of Patent: Feb. 14, 2012

(54) MATRIX SORTER SYSTEM

(75) Inventor: James L. Layne, Bowling Green, KY (US)

(73) Assignee: Span Tech LLC, Glasgow, KY (US)

( * ) Notice: Subject to any disclaimer, the term of this patent is extended or adjusted under 35 U.S.C. 154(b) by 1304 days.

(21) Appl. No.: 11/568,478

(22) PCT Filed: Apr. 28, 2005

(86) PCT No.: PCT/US2005/014790
§ 371 (c)(1),
(2), (4) Date: Oct. 30, 2006

(87) PCT Pub. No.: WO2005/107391
PCT Pub. Date: Nov. 17, 2005

(65) Prior Publication Data
US 2007/0267279 A1    Nov. 22, 2007

Related U.S. Application Data

(60) Provisional application No. 60/567,411, filed on Apr. 29, 2004, provisional application No. 60/618,853, filed on Oct. 14, 2004.

(51) Int. Cl.
*B65G 47/82* (2006.01)
(52) U.S. Cl. ......... 198/370.01; 198/457.02; 198/457.03; 198/348
(58) Field of Classification Search ............. 198/457.01, 198/457.02, 457.03, 370.06, 890; 209/583, 209/552, 656, 539
See application file for complete search history.

(56) References Cited

U.S. PATENT DOCUMENTS

| | | | |
|---|---|---|---|
| 2,700,453 A | | 1/1955 | Burbidge et al. |
| 3,404,775 A | | 10/1968 | McClellan |
| 3,451,526 A | | 6/1969 | Fernandez |
| 3,637,066 A | | 1/1972 | Idskov et al. |
| 3,643,781 A | * | 2/1972 | Risley et al. ............ 198/599 |
| 3,662,874 A | | 5/1972 | Muller |
| 3,977,513 A | | 8/1976 | Rushforth |
| 4,372,723 A | * | 2/1983 | De Coene et al. ......... 414/111 |
| 4,399,904 A | | 8/1983 | Canziani |
| 4,426,074 A | | 1/1984 | Fischer |
| 4,541,825 A | | 9/1985 | Hyde et al. |
| 4,569,434 A | | 2/1986 | Horii et al. |
| 4,619,358 A | * | 10/1986 | May et al. ............ 198/457.03 |
| 4,848,558 A | | 7/1989 | Rechsteiner |
| 4,917,230 A | * | 4/1990 | Barchman ................ 198/434 |
| 5,085,310 A | | 2/1992 | Scata et al. |
| 5,090,552 A | | 2/1992 | Fukuyama et al. |

(Continued)

FOREIGN PATENT DOCUMENTS

JP        08 198436        8/1996

(Continued)

*Primary Examiner* — Kavel Singh
(74) *Attorney, Agent, or Firm* — King & Schickli, PLLC

(57) ABSTRACT

A matrix conveying system for intended use in sorting articles and related methods of conveying and sorting articles are disclosed. In one embodiment, the matrix system comprises a plurality of first endless belt or chain conveyors extending in a first direction and a plurality of second conveyors extending in a second direction, each intersecting the plurality of first conveyors. The system may be used to sort articles delivered from one or more storage locations for distribution, or may instead be used to sort articles for delivery to one or more storage locations. In another embodiment, the system comprises three levels of intersecting conveyers

30 Claims, 7 Drawing Sheets

U.S. PATENT DOCUMENTS

| | | | |
|---|---|---|---|
| 5,421,446 A | | 6/1995 | Koch et al. |
| 5,564,264 A | * | 10/1996 | DeCrane .................. 53/251 |
| 5,613,597 A | * | 3/1997 | Palmaer et al. ............ 198/853 |
| 5,839,566 A | | 11/1998 | Bonnet |
| 5,860,504 A | * | 1/1999 | Lazzarotti ................ 198/357 |
| 5,975,282 A | * | 11/1999 | Shaver et al. ............. 198/603 |
| 5,990,437 A | | 11/1999 | Coutant et al. |
| 6,005,211 A | * | 12/1999 | Huang et al. ............. 209/583 |
| 6,230,872 B1 | | 5/2001 | Huang et al. |
| 6,236,008 B1 | | 5/2001 | Bonnet |
| 6,323,452 B1 | | 11/2001 | Bonnet |
| 6,390,275 B1 | | 5/2002 | Bonnet |
| 6,499,582 B1 | | 12/2002 | Gillott |
| 6,554,123 B2 | | 4/2003 | Bonnet |
| 7,619,358 B2 | * | 11/2009 | Yamamoto et al. .......... 313/509 |
| 2002/0179502 A1 | | 12/2002 | Cerutti et al. |

FOREIGN PATENT DOCUMENTS

| | | | |
|---|---|---|---|
| JP | 09-248531 | | 9/1997 |
| JP | 09248531 A | * | 9/1997 |
| JP | 2001-163443 | | 6/2001 |
| WO | WO 02/42012 | | 5/2002 |

* cited by examiner

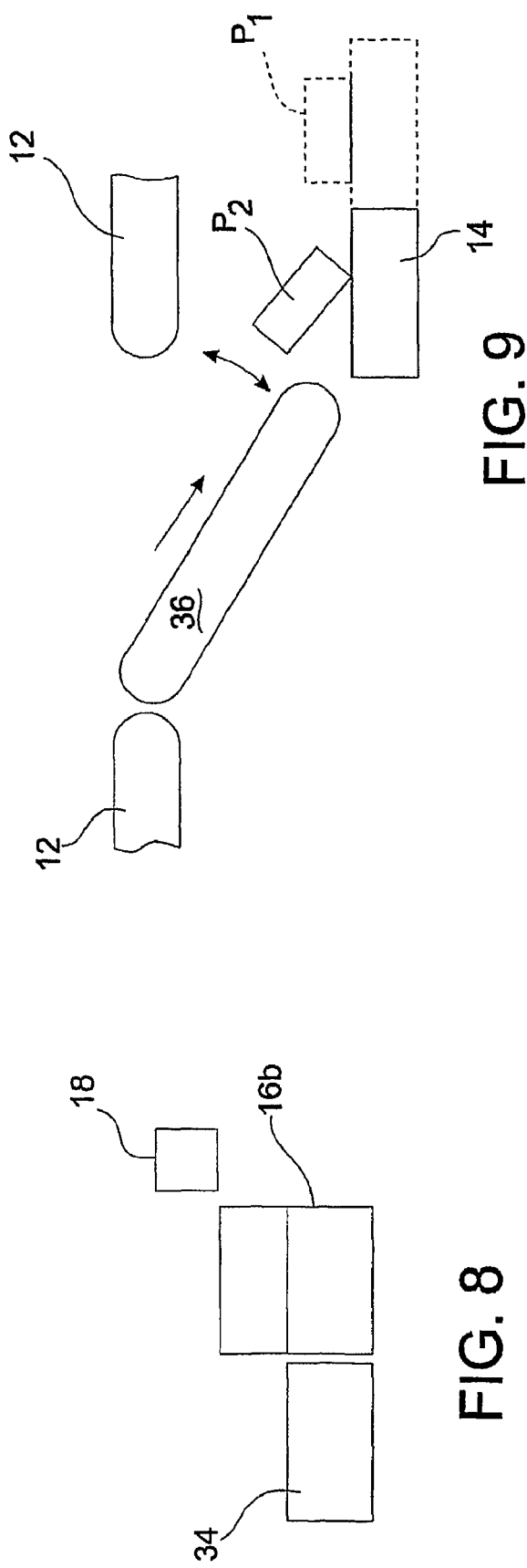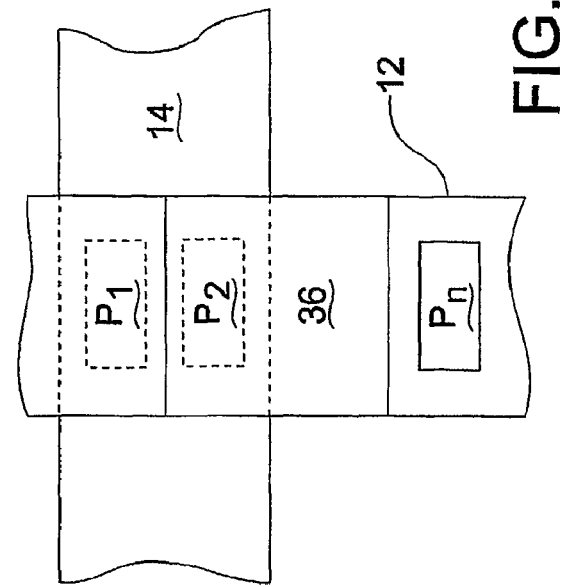

MATRIX SORTER SYSTEM

This application claims the benefit of U.S. Provisional Patent Application Ser. No. 60/567,411, filed Apr. 29, 2004, and Ser. No. 60/618,853, filed Oct. 14, 2004, the disclosures of which are incorporated herein by reference.

TECHNICAL FIELD

The present invention relates to the article conveying art and, in particular, to a system including a matrix of conveyors for conveying or sorting articles.

BACKGROUND OF THE INVENTION

Over the past several years, the demand from businesses and individuals alike for second day and even overnight deliveries of articles, such as small to mid-sized parcels, packages and letters, has steadily increased. This demand is due, in part, to the prevalence of Internet and mail order shopping, which creates a similar need for an efficient and effective distribution system to deliver expediently the wares to a common carrier. Consequently, the need for methods and systems for quickly transporting, sorting and distributing this ever increasing volume of articles has similarly increased.

In fact, it is now general practice for common carriers to transport articles in the form of small to mid-sized packages or the like to a central sorting terminal or hub, where they are sorted according to selected parameters, such as having common regional destinations, and then delivered as a group. Once these destinations are reached, it is necessary to sort again to distribute articles in the group to their final destinations. To accomplish these tasks in the amount of time required to insure overnight delivery, the central as well as the regional sorting terminals or hubs must receive, sort and distribute hundreds of thousands of coded packages each day. Besides on the delivery side, a similar need exists on the distribution side, since purchasers have become accustomed to receiving ordered items without significant delay.

Necessarily, the sortation systems used must be capable of processing the packages within these defined time parameters. Indeed, in response to the continuously increasing number of packages requiring next day or overnight delivery, the sortation systems must operate much faster and more efficiently than just a few years ago. It is also desirable for the systems to be more adaptable to accommodate fluctuations in need/demand, as well as simpler and less expensive.

Since as early as the 1960's, various package sortation systems have relied upon primitive "induction" type systems including an endless "loop" conveyor with mobile units that receive, transport and deposit packages at selected distribution stations. Specifically, U.S. Pat. Nos. 3,167,192 to Harrison et al. and 3,327,836 to Burt each disclose package sortation systems using tilt tray assembly units propelled by an endless conveyor chain. Timers and somewhat unreliable magnetic readers actuate tip solenoids to tilt the trays to one side, thus in theory allowing gravity to pull passively the packages from atop the trays upon reaching their destination. As should be appreciated, the speed with which such a system can process articles leaves much to be desired, especially since articles must potentially traverse the entire loop before reaching the desired destination.

A more recent sortation system described in U.S. Pat. No. 4,832,204 to Handy et al. integrates these prior art tilt tray sortation systems with more complicated scanning equipment and computer control in an attempt to improve overall system speed and efficiency. Despite the successful integration of these components into a supposedly more modern and state of the art system, and at a cost of much greater complexity and cost, the system of the '204 patent still fails to improve the basic sortation apparatus and methods. In essence, package delivery customers are calling for a move away from the continued reliance on the complex and expensive tilt tray systems that rely primarily on gravity transfer, such as in the '204 patent, and at the same time demanding significant increases in the overall speed, efficiency and adaptability of the sortation system.

In recent times, "tilt tray" sorters have been replaced by allegedly more efficient "cross belt" sorters. One version of this type of sortation system includes an endless train of driven cars pass operator-controlled feed conveyors used to deliver a single article for transport around the loop. When the car reaches the desired destination for the article, an onboard conveyor actuates to eject the article to a takeaway conveyor. An early example of this type of system appears in U.S. Pat. No. 3,977,513 to Rushforth, and a more modern example appears in the September 2003 issue of *Modern Material Handling* magazine (which is incorporated herein by reference).

Despite the industry-wide movement toward this type of sorting system, it still suffers from similar problems with efficiency. Just like in the tilt tray systems, only a single article can be loaded onto a selected car at a given instant in time. This serves as a significant limitation on the total throughput possible, and requires operating many such systems simultaneously to keep up with the demand. The use of individual cars with cross belts, which are typically complicated in construction, also presents problems from a reliability and maintenance standpoint.

Furthermore, past sortation systems cannot sort articles continuously, since various events demand downtime. For example, articles sometimes mis-introduced into the system must be retrieved and removed. Likewise, completing the previous sorting operation before introducing the next group of articles requires introducing any articles accidentally left out from the previous operation, which results in costly downtime. Running two induction-type sortation systems in parallel alleviates the problem in part, but this will not necessarily reduce the cost. The existing systems also tend to occupy a great deal of floor space, which may make this impossible to accomplish using a given facility.

Thus, an important aspect of the effort to improve this technology involves providing a sortation system and related method capable of transporting, sorting and distributing the increasing volume of such articles in a more efficient manner. The desired approach should eliminate the complexity, especially by eliminating tilt trays for ejecting articles being conveyed at a particular location, such as along an endless induction loop, and instead go to a simple arrangement of endless belt or chain conveyors. Increased efficiency and adaptability of use, as well as lower cost and maintenance, should advantageously result without a concomitant increase in complexity.

SUMMARY OF THE INVENTION

In accordance with one aspect of the invention, a conveyor system for intended use in conjunction with the sorting of articles comprises a plurality of first substantially continuous endless belt or chain conveyors extending in a first direction, each providing a first conveying surface for the articles. A plurality of second substantially continuous endless belt or chain conveyors extending in a second direction intersect the first conveyors. Each second conveyor provides a second conveying surface for any articles transferred from one or more of the intersecting first conveyors.

To automate the sortation process, the system preferably further includes means for transferring at least one article from at least one of the first conveyors to an intersecting one of the second conveyors. The transferring means may be provided adjacent each intersection for transferring one or more articles from each first conveyor to the associated second conveyor. In one embodiment, the first conveyors are positioned above the second conveyors, and the means for transferring articles comprises a portion of each first conveyor capable of assuming a drop down position for delivering one or more of the articles to the second conveyor. Preferably, an end of the drop down portion of each first conveyor is staggered relative to a lateral dimension of the associated second conveyor, which helps to avoid article collisions.

The first conveyors are parallel to each other and generally perpendicular to the second conveyors, and may include interconnected modular links. Furthermore, a plurality of third conveyors may be provided for receiving articles from the first or second conveyors, wherein the third conveyors intersect the first conveyors and extend generally parallel to the second conveyors. Optionally, the third conveyors may move the corresponding articles in a direction generally opposite that of the second conveyors.

In accordance with a second aspect of the invention, a conveyor system for intended use in conjunction with the sorting of articles comprises a plurality of first conveyors extending in a first direction in a first horizontal plane. A second conveyor extends in a second direction generally perpendicular to the first direction and in a second horizontal plane, and further intersects the plurality of first conveyors. Means adjacent each intersection is provided for transferring at least one article between the first and second conveyors to thereby effect sortation.

In one embodiment, the transferring means is an L-shaped transfer conveyor including a first portion aligned with the first conveyor and a second portion aligned with the second conveyor. Preferably, the second portion is tilted relative to a horizontal plane such that articles may slide onto the second conveyor. Alternatively, the transferring means may be selected from the group consisting of an active conveyor, a passive chute, and an elevator.

The second conveyor may be positioned either below or above the plurality of first conveyors. In either case, the system may further include means for moving the at least one article from the first conveyor to the transferring means. In one embodiment, the moving means is a diverter associated with the first conveyor.

In accordance with another aspect of the invention, a conveyor system for intended use in conjunction with the sorting of articles comprises a plurality of first conveyors extending in a first direction and a plurality of second conveyors extending in a second direction. The second conveyors are positioned above and intersect the first conveyors. At least one third conveyor extends in either the first or second direction and is positioned below the first conveyors.

Preferably, the first and second directions are generally perpendicular to each other, and the system includes means for transferring articles from one first conveyor to one second conveyor. The system may further include means for transferring articles from one first conveyor to the third conveyor. However, it is preferable to provide means for transferring articles at each intersection between the first, second, and third conveyors.

In accordance with still another aspect of the invention, a conveyor system for intended use in conjunction with the sorting of articles is disclosed. The system comprises a plurality of first conveyors extending in a first direction; a plurality of second conveyors intersecting the first conveyors; and a third conveyor for transferring articles from a first conveyor to a second conveyor at each intersection. Preferably, the third conveyor is L-shaped and includes a first portion aligned with the first conveyor and a second portion aligned with the second conveyor. The second portion may be tilted relative to a horizontal plane such that articles may slide onto the second conveyor.

In accordance with yet another aspect of the invention, a conveyor system for intended use in conjunction with the sorting of articles comprises a plurality of first conveyors extending in a first direction, a plurality of second conveyors intersecting the first conveyors, and at least one receiver associated with each second conveyor for receiving articles having a particular characteristic in common. The common characteristic may be, for example, a delivery destination selected from the group consisting of a country, region, state, zip code, county, city, village, town, and street address.

Preferably, each second conveyor is associated with a takeaway conveyor for delivering a selected article to the receiver. The system may further include a plurality of receivers, each associated with a takeaway conveyor for delivering a selected article from the corresponding second conveyor. The takeaway conveyor may be an indexing conveyor including two or more segments, each capable of independently conveying an article to the corresponding receiver.

In accordance with a further aspect of the invention, a matrix sortation system comprises three different levels of conveyors, including a first level of first conveyors, a second level of second conveyors intersecting the first conveyors, and a third level of third conveyors. The first conveyors may be infeed conveyors and the second and third conveyors are takeaway conveyors. Alternatively, the first and third conveyors may be infeed conveyors and the second conveyors may be takeaway conveyors In accordance with yet a further aspect of the invention, a method of conveying articles is disclosed. The method comprises transporting articles along a plurality of first endless belt or chain conveyors extending in a first direction. The method further comprises transferring an article from at least one first conveyor to one of a plurality of second conveyors extending in a second direction and intersecting the plurality of first conveyors. The method may further include the step of selecting an article for transfer to one of the second conveyors prior to the transferring step, which in turn may comprise identifying a common characteristic of the article. Still further, the method may include the steps of: (1) transferring the article from the second conveyor to a receiver; or (2) simultaneously transferring articles from a first conveyor to two different second conveyors.

In accordance with yet another aspect of the invention, a method of conveying articles comprises transporting articles along a plurality of first conveyors extending in a first direction; transferring a first selected article from one first conveyor to a second conveyor extending in a second direction and positioned below the first conveyors; and transferring a second selected article from one first conveyor to a third conveyor extending in the second direction and positioned above the first conveyors. The transferring steps may comprise actively or passively conveying the corresponding article.

Still another aspect of the invention is a method of sorting articles. The method comprises providing a matrix including a first level of first conveyors extending in a first direction, a second level of second conveyors below the first conveyors and extending in a second direction, and a third level of third conveyors above the first conveyors parallel to the second conveyors. The method further comprises sorting a batch of articles delivered to the first conveyors by selectively delivering the articles from the corresponding first conveyor to a selected one of the second or third conveyors. The batch of articles may include first articles and second articles, in which case the sorting step is performed by delivering the first article from the corresponding first conveyor to the selected one of the second conveyors, and then delivering the second article from the corresponding first conveyor to the selected one of the third conveyors.

A further aspect of the invention is a method of sorting articles. The method comprises providing a matrix comprised of a first level of first conveyors extending in a first direction, a second level of second conveyors below the first conveyors and extending in a second direction, and a third level of third conveyors above the first conveyors parallel to the second conveyors. The method further comprises: (1) sorting a first batch of first articles delivered to the first conveyors by selectively delivering the first articles from the corresponding first conveyor to a selected one of the second conveyors; and (2) sorting a second batch of second articles delivered to the first conveyors by selectively delivering the second articles from the corresponding first conveyor to a selected one of the third conveyors. The sorting of the first and second batches may be done simultaneously, or instead, the sorting of the first batch of articles may be completed prior to the sorting of the second batch of articles.

In accordance with one other aspect of the invention, a method of delivering articles requiring sortation to a warehouse is disclosed. The method comprises delivering the articles to a plurality of infeed conveyors; transferring articles to one of a plurality of takeaway conveyors intersecting the infeed conveyors and associated with a particular storage location; and delivering the articles to the storage location. The method may further comprise the steps of: (1) delivering the articles from a storage location to one of the plurality of infeed conveyors; and (2) transferring articles having a common characteristic from the infeed conveyor to one of the plurality of takeaway conveyors.

BRIEF DESCRIPTION OF THE DRAWINGS

FIG. 8 is an end view of two of the conveyors forming part of the system of FIG. 7;

FIG. 9 is a partially cutaway side schematic view of one possible means for transferring articles between two conveyors; and FIG. 10 is a partially cutaway top plan view of a transferring means similar to the one shown in FIG. 9.

DETAILED DESCRIPTION OF THE INVENTION

Figure 1:
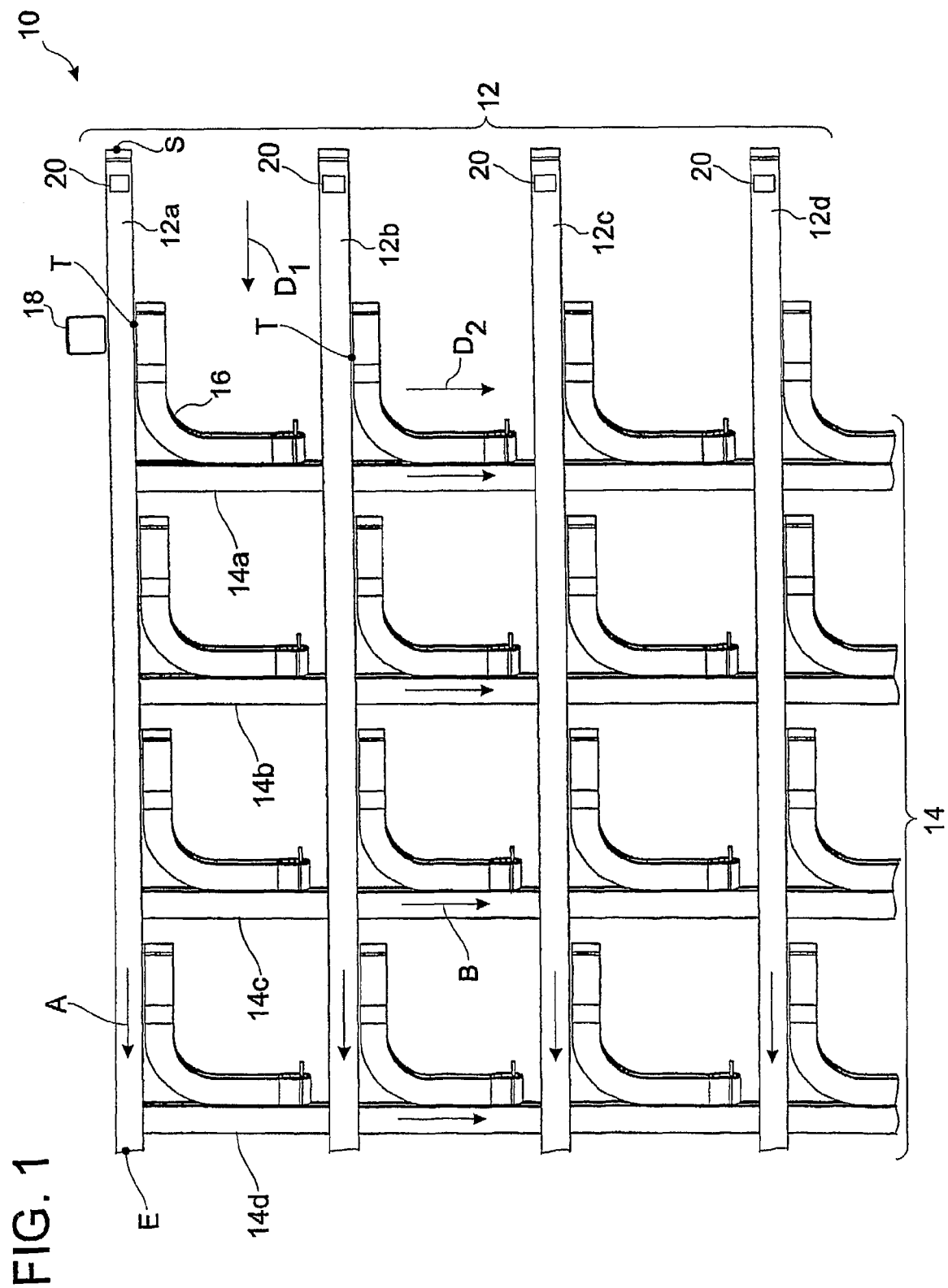
FIG. 1 is a partially cutaway plan view of the sortation system forming one aspect of the invention.

With reference to FIG. 1, one possible embodiment of a sorter system 10 forming one aspect of the invention is schematically illustrated. As illustrated, the sorter system 10 may comprise a "matrix" formed of a plurality of intersecting belt or chain conveyors 12, 14 extending in different directions. Each conveyor 12, 14 is of the endless belt or chain type, and thus provides a substantially continuous conveying surface for articles (as contrasted from tilt tray sorters, which unlike belt or chain conveyors create a substantially interrupted conveying surface). Although certainly not a requirement, a preference exists for the types of endless belt or chain conveyors manufactured and sold by Span Tech, LLC under THE DESIGNER SYSTEM® trademark, the details of which are found in U.S. Pat. Nos. 4,953,693 and 5,031,757 (which are incorporated herein by reference).

As a result of this arrangement, each intersection represents a possible or potential location or point T for transferring an article between the associated conveyors 12, 14. Consequently, two or more selected articles conveyed along different infeed conveyors 12 extending in one direction may undergo simultaneous sortation and delivery to one or more of the takeaway conveyors 14 extending in a different direction and associated with a particular destination (such as a delivery truck, receiver, or sortation subsystem). By creating a system 10 including numerous infeed and takeaway conveyors 12, 14 extending in both directions and selectively moving articles between them at the desired intersections, article sortation can thus be achieved in a highly efficient and effective manner, and one heretofore unknown using prior types of endless loop induction systems.

In the embodiment shown in FIG. 1, the infeed and takeaway conveyors 12, 14 of the system 10 extend generally perpendicular to each other (note first and second orthogonal directions $D_1$ and $D_2$) in a spaced apart fashion and thus form a "regular" grid (e.g., 4×4, although an irregular grid (2×3, 4×5, 40×50, etc.) could easily be used as well). In this particular illustrated embodiment, the matrix system 10 comprises: (1) a first set or series of infeed belt or chain conveyors 12a-12n extending in a first longitudinal direction (four conveyors shown, labeled 12a-12d); and (2) a second set or series of takeaway belt or chain conveyors 14a-14n extending in a second longitudinal direction transverse to the first direction (four shown, labeled 14a-14d). These infeed and takeaway conveyors 12, 14 preferably each associate with a distinct starting point S and ending point E (i.e., they are linear or straight and independent from each other, as contrasted with known prior art induction systems using an endless loop conveyor with a continuous train of cars to effect sortation). Preferably, the conveyors 12, 14 in each series extend generally parallel to each other, including in the portion comprising the system 10, and move in the same direction (note arrows A and B in FIG. 1) along an endless path.

Figure 2:
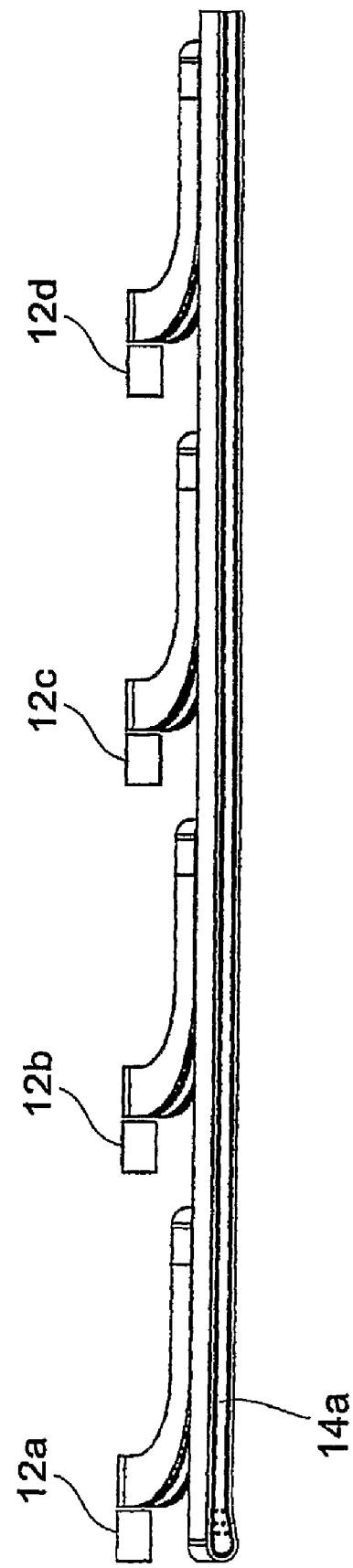
FIG. 2 is a partially cutaway side view of the system of FIG. 1.

As perhaps best shown in FIG. 2, the infeed conveyors 12a-12d generally lie in a first horizontal plane above the secondary or takeaway conveyors 14a-14d, which are in a second, different horizontal plane. This provides the system 10 with multiple layers, levels, or tiers of conveyors 12, 14. In one proposed embodiment, the infeed conveyors 12a-12d all lie above the takeaway conveyors 14a-14d. However, as indicated in the description that follows, this arrangement may be reversed or, alternatively, more than two layers of intersecting conveyors may be used, with some above and some below each other (see FIG. 7). Although not shown, it should be appreciated that the conveyors 12, 14 are all preferably supported above the ground, such as in the manner disclosed in the '693 or '757 patents.

In accordance with another aspect of the invention, means for transferring at least one selected article between the conveyors may be provided at or near each intersection between a infeed conveyor 12 and a takeaway conveyor 14. In the embodiment of FIG. 1, the means for transferring comprises a transfer conveyor 16. Preferably, the transfer conveyor 16 is a generally L-shaped, driven, endless belt or chain conveyor, oriented such that the articles transferred onto it move from the plane of the corresponding infeed or first conveyor, such as conveyor 12a, to the corresponding takeaway or second conveyor, such as conveyor 14a. The use of an L-shaped transfer conveyor 16 as illustrated is especially preferred in situations where the articles have a direction of elongation, since the article upon reaching the takeaway conveyor 14 will normally assume the exact same orientation it had on the infeed conveyor 12 (which may have been selected by the person placing the articles to ensure that an indicia such as a bar code was in a proper position for being read). However, the use of a linear or passive transfer conveyor 16, such as for example, a straight endless conveyor or a passive slide/chute, is also possible.

To move one or more of the articles selected for transfer onto the conveyor 16, a diverter 18 may be used. The diverter 18 functions to divert or move a selected article onto the transfer conveyor 16, and may thus comprise any structure for performing this function. For example, the diverter 18 may comprise a retractable arm, gate, lug, or guide for moving into the path of a selected article on the associated infeed conveyor 12 and directing it onto the transfer conveyor 16. Alternatively, the diverter 18 may comprise a picker, kicker, pusher, or like motive device.

As should be appreciated from the foregoing, the particular means used to move any selected article between the conveyors 12, 14 could vary depending on the arrangement used and any special needs (e.g., conveying delicate articles versus books). Likewise, instead of an active transfer conveyor 16, the transferring means for example may comprise a pusher, kicker, ejector, lifter, elevator, actuator or combinations thereof for transferring an article from one conveyor to another, including in possible combination with a chute or conveyor. Although not preferred, the possibility of using a manual "pick and place" operation at each intersection exists (which especially helps when one or more of the takeaway conveyors are above the infeed conveyors). In any case, selected articles reliably make their way from the infeed conveyors 12 to at least one of the takeaway or secondary conveyors 14, thereby effecting the desired sortation.

Turning back to FIG. 2, the portion or leg of the L-shaped transfer conveyor 16 adjacent to and generally aligned with the takeaway conveyor 14a may be tilted relative to a horizontal plane. Advantageously, this tilting may cause an article being conveyed along the transfer conveyor 16 to slide automatically onto the associated takeaway conveyor 14 without the need for active engagement. A passive diverter (not shown), such as a fixed gate, may also be provided at or near the end of this leg of the transfer conveyor 16 to help insure that any articles that do not slide off are ultimately diverted. However, instead of a tilted arrangement with a passive diverter, it is also possible to provide an active diverter (not shown) for moving articles from a non-tilted section of the conveyor 16. In order to insure that proper selection for transfer is achieved (and thus sorting provided), articles approaching on the infeed conveyor 12 may be identified visually by an operator or using well-known types of "machine vision" scanning technology (e.g., reading a bar or other code using an adjacent (preferably overhead) reader 20)). Preferably, the article spacing on each infeed conveyor 12 is such that only one selected article is transferred at a time. However, unlike in prior systems utilizing tilt trays running in endless loops in which only a single article may be processed at a given instant in time, articles for delivery to common destinations may simultaneously transfer from different infeed conveyors 12a-12d to one or more of the takeaway conveyors 14a-14d. More efficient sorting operation and a potential multi-fold increase in throughput without a concomitant increase in conveying speed results.

In the case where all articles divert or transfer onto takeaway conveyors 14a-14n, then the infeed conveyors 12a-12n may simply terminate. However, an alternative approach extends one or more of the infeed conveyors 12a-12n such that articles not transferred ultimately reach a downstream location for further processing. For example, an article remaining on one infeed conveyor 12a, such as the result of inadvertent placement, and not actually needed to fill an order made (and thus not transferred to any of the takeaway conveyors 14a-14n), may reach a "reject" bin (not shown). Alternatively, such articles may collect on a single return conveyor (not shown) extending back to an associated storage area.

Another alternative involves delivering the articles remaining on the infeed conveyors 12a-12n to another sorter system, including possibly another matrix system (not shown). In the latter case, a "single row" matrix may include a single endless belt or chain infeed conveyor having a continuous conveying surface and a plurality of takeaway conveyors intersecting this infeed conveyor. This arrangement may work well in situations where the articles are all intended for delivery to different addresses in the same city or zip code or otherwise share a common characteristic.

Figure 3:
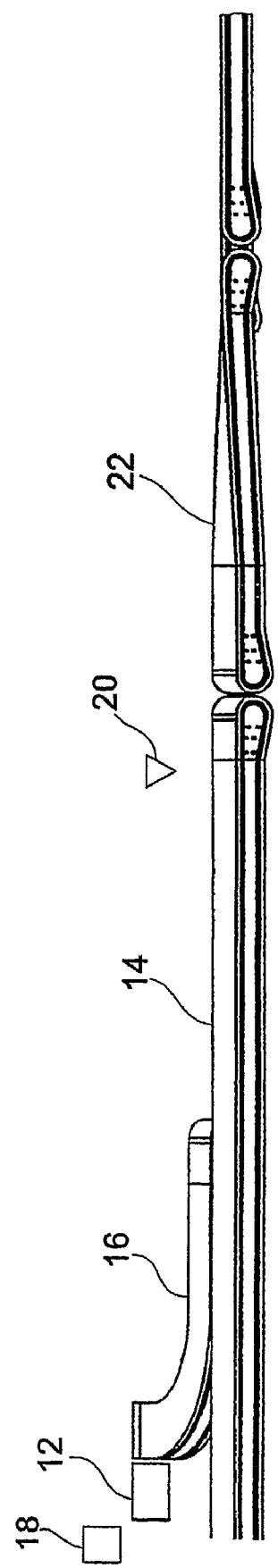
FIG. 3 is a partially cutaway side view of a takeaway conveyor associated with the system of FIG. 1.

Turning to FIG. 3, each takeaway conveyor 14a . . . 14n in the system 10 may also orient at an angle, or "tilt," relative to the horizontal plane in a direction transverse to the conveying direction, either at the transfer point or at a downstream location. Such tilting causes transferred articles to slide down along the corresponding conveying surface to a known edge, which may be defined by a side guard (not shown) adjacent to the associated takeaway conveyor 14. As should be appreciated, this tilting generally turns the articles to achieve a particular orientation (e.g., short end leading, in the case of an elongate article) for a desired operation (e.g., reading a bar code, such as using an adjacent reader 20). Once the operation is complete, it may also be desirable as shown in FIG. 3 to provide a portion of the conveyor 14 with a "twist" section 22 that returns the article to a position parallel with a horizontal plane before undergoing further processing.

Exemplary uses of the matrix sorter system 10 described above are myriad. One such use involves a facility for delivering articles such as books from a storage location in a warehouse to a particular destination (such as to a packaging area or loading dock for shipping to retail stores). In particular, each infeed conveyor 12 associates with a grouping of books within the warehouse. A "pick to light" system visually identifies to a "picker" the books at the storage location in the warehouse (such as an adjacent shelf or pallet) to place on the infeed conveyor 12. Pickers may thus place individual books on different infeed conveyors 12 running in parallel or alternatively on a single conveyor that ultimately divides into several infeed conveyors associated with the system 10.

In either case, the books on each infeed conveyor 12a . . . 12n upon approaching the system 10 undergo identification, either by an operator or a machine scan (in which case, a person positioned upstream of the scanning location may ensure the books are in the proper orientation and singulated (e.g., separated by a certain minimum distance in the conveying direction)). Each takeaway conveyor 14 may be associated with a common parameter or characteristic shared by some books (e.g., those going to a particular destination, company/individual, distribution center, store, sorting location, etc.). Once identified, the corresponding books on the various infeed conveyors 12 are identified and then transferred to the correct takeaway conveyor 14 to effect sortation in the desired fashion using the above-described transfer techniques (which, again, are preferably automated, but may instead be manual or semi-automated).

Downstream along the takeaway conveyor 14, the books may undergo further sorting, if necessary (such as if those having different destinations are transferred). Of course, placing persons along this conveyor 14 to identify and move the books to packages, bins, bags, carriers, etc. works for this purpose. Alternatively, and as discussed further below, this "sub" sorting may instead use an automated system, such as one that detects and routes each book to an appropriate takeaway conveyor for delivery to a receiver (e.g., bag, box or bin) representing an order.

Figure 4:
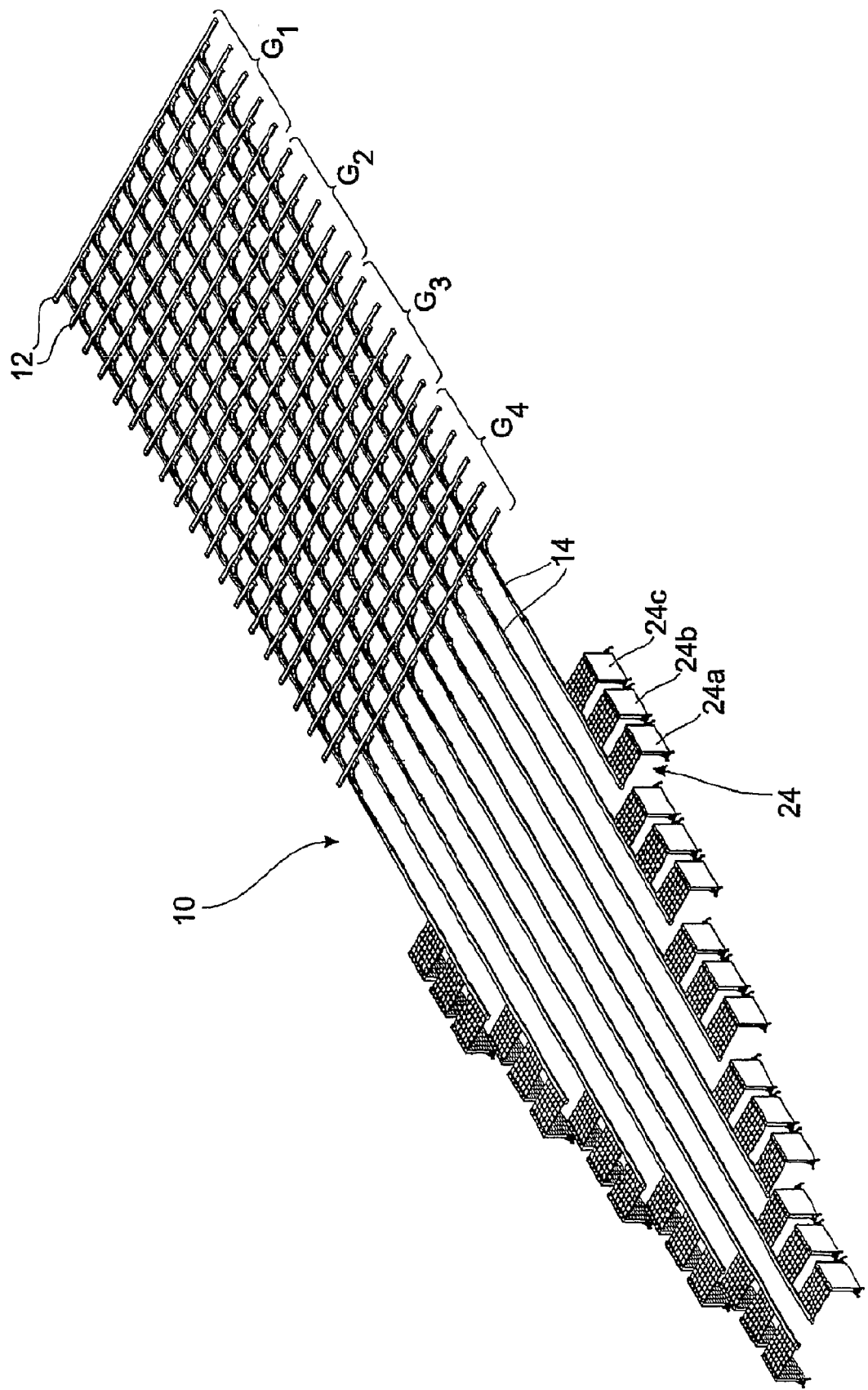
FIG. 4 is a perspective view showing another embodiment of the sortation system.

An example of a particular sub-sorting arrangement useful with a matrix sorter system 10 essentially as described above is shown in FIGS. 4-6. FIG. 4 shows that the overall system 10 comprises a plurality (twenty) infeed conveyors 12 extending in a first direction and a plurality (ten) of takeaway conveyors 14 extending in a second direction. The takeaway conveyors 14 generally lie in a common horizontal plane, but are positioned below the infeed conveyors 12. Each of the ten takeaway conveyors 14 associates with one or more sortation "stations" 24. In the illustrated embodiment, three such stations 24a, 24b, 24c lie spaced from each other in the conveying direction and on the same side of a common takeaway conveyor 14 (which it should be appreciated may be a distinct conveyor from the one forming part of the basic system 10).

Figure 6:
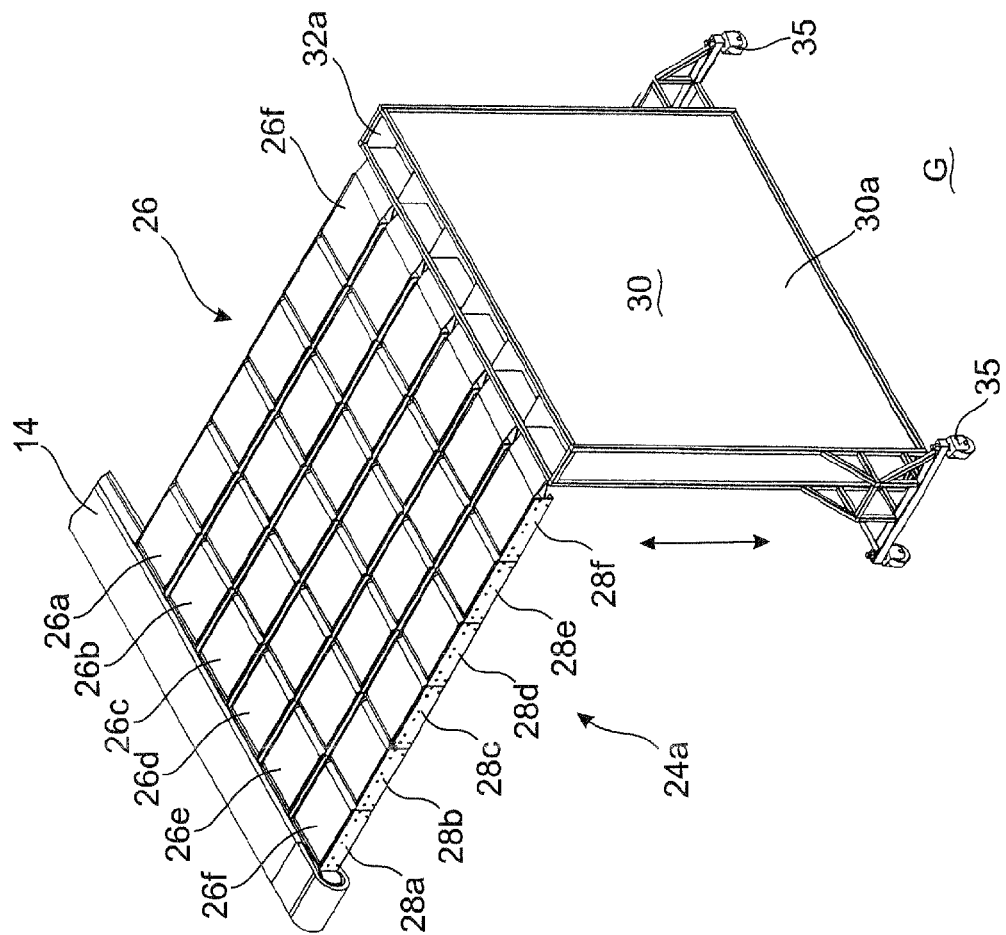
FIG. 6 is a partially cutaway perspective view of a sub-sorting station.
Figure 5:
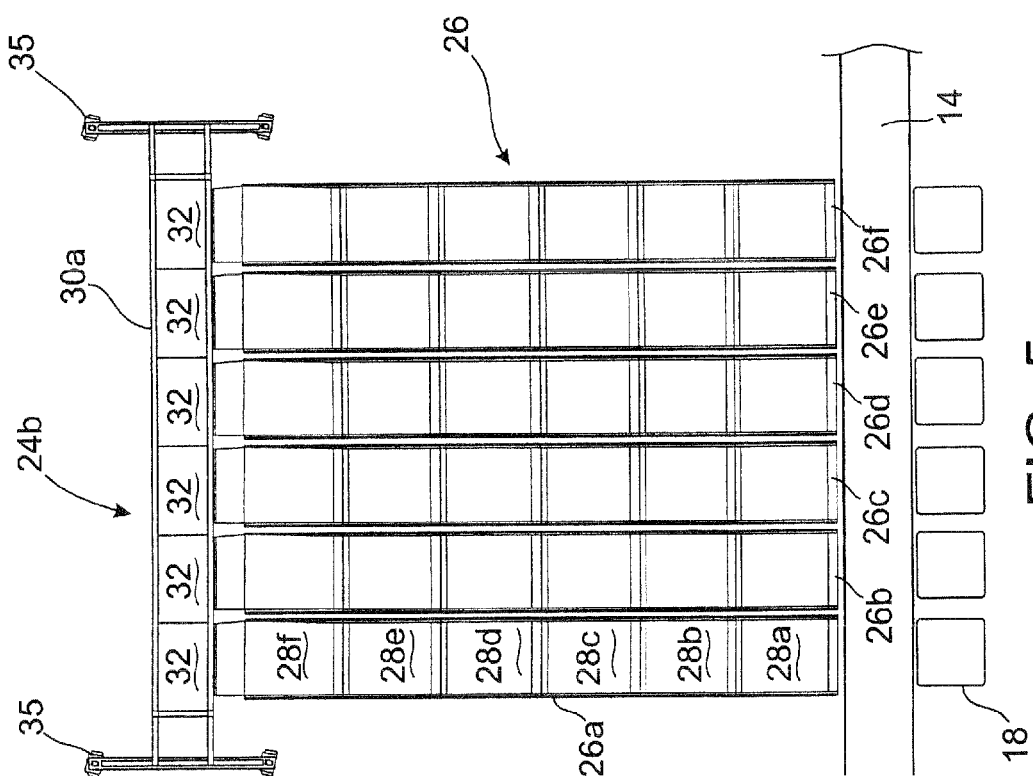
FIG. 5 is a partially cutaway top plan view of one embodiment of a sub-sorting station.

Turning to FIGS. 5 and 6, it can be seen that each station 24 comprises at least one and preferably a plurality of transverse conveyors 26 for delivering the articles from the associated takeaway conveyor 14 to a temporary storage location corresponding to articles sharing a common characteristic (e.g., those comprising a particular order, or those going to a particular country, region, state, zip code, city, town, village, address, etc.). In the embodiment shown, six such substantially continuous conveyors 26a-26f extend in parallel. Preferably, each conveyor 26a-26f comprises an "indexing" conveyor including a plurality of individual conveyor segments arranged in series (with six segments 28a-28f shown for purposes of illustration only), which together define each continuous conveyor. A common electric motor (not shown) may drive these segments 28a-28f at the same speed and in the same direction, or alternatively separately actuated motors may drive them independent of each other. As indicated in FIG. 5, a selected article may be transferred to the leading segment 28a of each indexing conveyor 26a-26f from the takeaway conveyor 14 using an associated diverter 18.

A sensor (not shown) associated with each conveyor segment 28a-28f may detect the presence of an article thereon. A conventional "photoeye" arrangement or mechanical type sensor (e.g., a weight sensor, a physical contact switch, etc.) may serve in this role. Upon an article transferring from the takeaway conveyor 14 to one of the indexing conveyors 26a-26f, the corresponding segments 28a-28f run until the sensor associated with the segment 28a closest to the storage location, or bin 30, detects the article.

In the event a second article for delivery to a second location or bin 30 reaches that same indexing conveyor 26a-26f, that article transfers in a similar fashion. The second article conveys until it reaches the segment 28b upstream of the segment 28a holding the first article, which may be held stationary. This sequence can be repeated until an article associates with each segment 28a-28f of each indexing conveyor 26a-26f.

Once one or more of the indexing conveyors 26a-26f are loaded, the articles transfer to the appropriate storage location. In the illustrated embodiment, this comprises a structure 30 including a plurality of bins 32 arranged in columns corresponding to the number of indexing conveyors 26a-26f. The number of rows may be as few as one (in which case the indexing conveyor described above could be replaced with a simple continuously running conveyor for transferring selected article(s) from the takeaway conveyor 14 to the appropriate bin). However, to maximize the throughput, the number of bins preferably corresponds at least to the number of segments on the associated indexing conveyor, and most preferably to the number of segments 28 times the number of conveyors 26. Thus, in the example where six indexing conveyors comprise six segments each, the structure 30 is six bins by six bins.

The outfeed end of each indexing conveyor 26a-26f nominally lies adjacent only one row of bins 32. If any article on the farthest downstream indexing conveyor 26a-26f belongs in one of those bins (which may be known using either on the spot detection (manual or automatic) or controls), then the corresponding indexing conveyor actuates such that the article transfers to the desired bin. The next-in-line article then advances as described above until the sensor associated with the furthest downstream segment (segment 28a in the example) detects the article. If that article belongs in the same bin as the preceding one (such as if both are going to a common destination or otherwise share a common characteristic), then it too transfers.

Once all articles slated for a bin in the nominal row transfer, the structure 30 may be moved to associate the bins of another row with the outfeed end of the indexing conveyors 26a-26f, and the sequence described above repeats. In the case where the bins 32 are spaced both horizontally and vertically from each other, this may be accomplished by using a lifter to raise and lower the structure 30 such that an article to be transferred from the furthest downstream segment 28a of each indexing conveyor 26a-26f is positioned adjacent the correct bin, at which time that segment activates to effect delivery. Alternatively, the transverse conveyors 26 may move to associate with the correct bins 32.

As illustrated, the structure 30 may be mobile, such as through the provision of wheels 35. Once sortation ends for a given run or shift, the structure 30 may move to a location where the articles are further processed (such as for packaging). In the interim, a replacement structure may be associated with the station 24 such that the sortation efficiency remains unhindered because of the time required to check and unload the bins.

As noted above, each structure 30 in the arrangement shown in FIGS. 4-6 thus includes thirty-six bins. In this exemplary arrangement, three structures 30 associate with each takeaway conveyor 14, and ten takeaway conveyors exist. The total number of possible sort destinations equals 1,080. If the twelve rows of bins exist instead of six, this figure doubles and thus becomes 2,160. If six stations associate with each secondary conveyor, it doubles again to 4,320. Then doubling the number of takeaway conveyors (including by possibly adding a third level of conveyors; see below) to twenty results in 8,640 possible sort addresses, a figure unheard of using a conventional single induction loop of any reasonable size.

An alternative to a vertical arrangement is one where the structure 30 shown in FIG. 6 lies with its back 30a parallel to the ground such that the bin entrances 32a are positioned below the indexing conveyors 26a-26f. A linear motion device could then move the structure 30 to and fro as necessary to ensure that the articles transferred from the segments fall into the appropriate bin. Likewise, providing fewer rows than the number of indexing conveyors makes it necessary to move the structure 30 in two different directions to match the next-in-line article with the corresponding bin.

Instead of using the arrangement shown in FIGS. 5 and 6, yet another option involves accomplishing further sorting downstream of the matrix by separating the flow onto a plurality of "lines," such as by using a series of parallel-running conveyors and a diverter (not shown) to route the articles accordingly. The individual conveyors in these lines may then form the infeed conveyors of a second matrix system (not shown), which can further sort the articles into even smaller sub-groups. The process may repeat as necessary to create the desired degree or "level" of sortation for a particular operation.

Rather than using a matrix system 10 to deliver articles from a storage location, it may find utility in a converse arrangement. For example, upon receiving a delivery, the articles (boxes, packages, etc.) requiring sortation may transfer to an infeed conveyor at the warehouse that ultimately splits into a plurality of the infeed conveyors 12 of the matrix system 10. Sortation of the articles may follow as described above to place all those with a common parameter or characteristic on a particular takeaway conveyor 14 for delivery to a particular storage location in the warehouse (e.g., one for books on a certain topic reside, books having a title beginning with a particular letter of the alphabet reside, etc.). The takeaway conveyors 14 can then be switched to infeed conveyors 12 for delivering articles for delivery back to the matrix 10, which would then sort those articles having the common characteristic that triggers transfer to the takeaway conveyors (which formerly served as infeed conveyors).

In accordance with still another aspect of the invention, the matrix system 10 may also include three or more levels of conveyors. For example, the third conveyors of this level may receive selected articles from the second takeaway conveyors for delivery to different destinations. Alternatively, these third conveyors may serve as second infeed conveyors for delivering articles to takeaway conveyors 14 also common to the first infeed conveyors 12, or instead may also receive articles from the infeed conveyors and thus function as a second set of takeaway conveyors.

Figure 7:
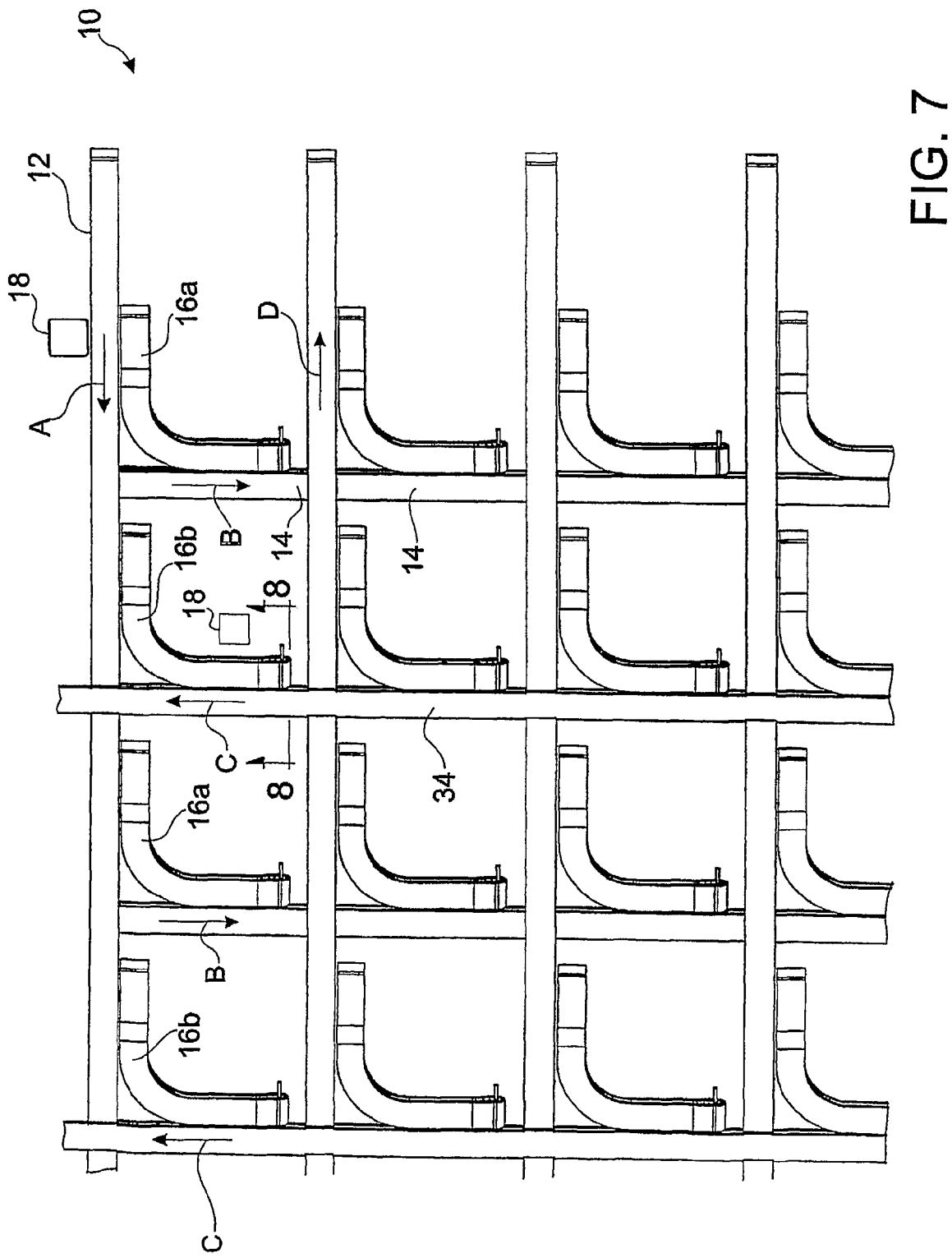
FIG. 7 is a partially cutaway plan view of yet another embodiment of the sortation system, including three levels of conveyors.

In the latter case, the third conveyors preferably extend parallel to the second takeaway conveyors 14 and may lie either above or below the infeed conveyors 12 (with corresponding means, such as chutes or powered elevators, used to transfer the articles depending on the orientation used). However, the third conveyors preferably run in a direction opposite that of the takeaway conveyors 14 and are associated with downstream sub-sortation stations (either individuals for placing the objects in bins, automated sorters for doing so, etc.). This is shown in FIG. 7 by opposing arrows B and C along the takeaway conveyors 14 and the third conveyors 34, respectively (with arrows A and D also showing that the infeed conveyors 12 may also run in different directions). The means for transferring articles may include a transfer conveyor 16 similar to the one described above, but capable of elevating the articles in a reliable fashion (such as by using a high-friction surface, scoops, cleats, a "wedge" conveyor, or similar types of arrangements that are well known in the art for reliably conveying articles against gravity). As perhaps best understood with reference to FIG. 8, it is also preferable for the transfer conveyor 16 to terminate in a plane above the corresponding third conveyor 34, such that transferred articles simply drop onto the conveying surface.

As should be appreciated, a matrix system 10 with two or more sets of takeaway conveyors may provide several advantages in use. For example, in the case of two levels of takeaway conveyors 14, 34, the ability to transfer articles from the infeed conveyor 12 to either a second or third takeaway conveyor 14 or 34 during a single run can significantly increase the potential throughput of the system 10. This increase results without a corresponding increase in the conveying speed, which helps to make the overall operation more relaxed and effective than most conventional approaches.

Another possibility involves alternating between the two levels of takeaway conveyors 14, 34 in the matrix sorter system 10. For example, the lower takeaway conveyors 14 used in conjunction with the infeed conveyors 12 may sort a first batch or group of articles introduced to the system 10. After the articles comprising the first batch move from the infeed conveyors 12, a second group of articles (of the same or a different type) may be introduced to the system 10 and transferred to the upper takeaway conveyors 34 while the first group are simultaneously being conveyed and sorted downstream on the lower takeaway conveyors 14. Using such an arrangement may allow for continuous operation of the system 10, despite the possible need for periodic downtime with one level of takeaway conveyors 14 or 34 after sorting a batch of articles (such as to address mis-sorted articles or situations where one or more articles are incorrectly introduced into the system and need to be replaced to fill a particular order).

Still another possible use of a matrix system involves operating only a portion of the infeed conveyors 12 at a given time. For example, in the arrangement shown in FIG. 4, only one of four groups $G_1$, $G_2$, $G_3$, $G_4$ of five infeed conveyors 12 may deliver articles to the takeaway conveyors 14 (or deliver articles from only a certain storage location in a warehouse) during a first shift, with other groups used during different shifts. This maintains constant wear on the conveyors of the various groups and also extends their service life. At times when an increased number of articles require sortation (i.e., at Christmas), then all corresponding infeed conveyors 12 present may run simultaneously.

An alternative means for transferring articles between the conveyors 12, 14 may comprise a separately actuatable dropdown portion 36 of the associated infeed conveyor 12 (see FIGS. 9 and 10, as well as U.S. Pat. No. 4,426,074, the disclosure of which is incorporated herein by reference). Obviously, these drop down portions 36 would be placed at or near the intersections with the takeaway conveyors 14, which as should be appreciated represent possible or potential transfer points.

In the case of drop down portions 36, offsetting or "staggering" the transfer points along the lateral extent of the takeaway conveyors 14a-14d comprising the system 10 prevents collisions among articles transferred from upstream infeed conveyors (such as infeed conveyors 12a-12c in the case of four). FIG. 9 illustrates this approach by making each second or takeaway conveyor 14 wider than the associated first or infeed conveyor 12 (note phantom portion), and/or by selectively positioning the end of the drop down portion 36. This allows for the easy and efficient placement of articles at different locations along the width of the takeaway conveyor 14, while preventing collisions with articles delivered from an upstream transfer point associated with a different infeed conveyor 12. In other words, the initial location of each article upon transfer may be staggered along the lateral dimension of the associated takeaway conveyor 14. This is illustrated by showing packages or parcels $P_1$ and $P_2$ in a side-by-side configuration in FIG. 10 (which shows the actual transfer of the second package or parcel $P_2$ to the takeaway conveyor 14 via the delivery end of a "staggered" drop down portion 36).

The foregoing descriptions of various embodiments of sorter systems and related methods provide illustration of the inventive concepts. The descriptions are not intended to be exhaustive or to limit the disclosed invention to the precise form disclosed. Modifications or variations are also possible in light of the above teachings. For example, the conveyors 12, 14, 16, 34 if comprised of modular links may be provided with specialized links or rollers to facilitate article transfer (see, e.g., U.S. Pat. No. 6,874,617 to Layne, the disclosure of which is incorporated herein by reference). Also, it should be appreciated that books are mentioned merely to illustrate one possible type of article capable of being conveyed or sorted using the disclosed inventions. The embodiments described above were chosen to provide the best application to thereby enable one of ordinary skill in the art to utilize the inventions in various embodiments and with various modifications as are suited to the particular use contemplated (such as, again, for conveying or sorting articles other than books). All such modifications and variations are within the scope of the invention.

The invention claimed is:

1. A conveyor system for intended use in conjunction with the sorting of articles, comprising:
    a plurality of first substantially continuous endless belt or chain conveyors extending in a first direction, each providing a first continuous, uninterrupted conveying surface for the articles; and
    a plurality of second substantially continuous endless belt or chain conveyors extending in a second direction, each of said first conveyors overlapping the plurality of second conveyors, each at least one of said second conveyors providing a second conveying surface below at least one of the first conveyors, said second conveying surface arranged for conveying any articles transferred from one or more of the first conveyors, wherein an intersection is formed between each first conveyor and second conveyor, and wherein the first conveyors are positioned above the second conveyors; and
    means adjacent each intersection for transferring one or more articles from each first conveyor to the associated second conveyor adjacent the intersection, said means comprising a portion of each first conveyor capable of assuming a drop down position for delivering one or more of the articles to the second conveyor.

2. The system according to claim 1, wherein an end of the drop down portion of each first conveyor is staggered relative to a lateral dimension of the associated second conveyor.

3. The system according to claim 1, wherein the belts or chains of the first conveyors include conveying surfaces having longitudinal dimensions that are parallel to each other and generally perpendicular to the longitudinal dimensions of the conveying surfaces of the belts or chains of the second conveyors.

4. The system according to claim 1, wherein a longitudinal dimension of the first conveying surface of at least one first conveyor extends generally perpendicular to a longitudinal dimension of the second conveying surface of at least one second conveyor.

5. The system according to claim 1, wherein the first and second conveyors are chain conveyors including interconnected modular links.

6. The system according to claim 1, further including a plurality of third conveyors for receiving articles from the first or second conveyors, wherein the third conveyors intersect the first conveyors and extend generally parallel to the second conveyors.

7. The system according to claim 6, wherein the third conveyors move the articles in a direction generally opposite that of the second conveyors.

8. The conveyor system of claim 1, wherein each of the first and second conveyors comprises a linear conveyor having a starting point at one end and an end point at a second end.

9. The conveyor system of claim 1, wherein each first conveyor overlaps any one second conveyor only one time.

10. A conveyor system for intended use in conjunction with the sorting of articles, comprising:
    a plurality of first conveyors extending in a first direction in a first horizontal plane;
    a second conveyor extending in a second direction generally perpendicular to the first direction and in a second horizontal plane, the second conveyor overlapping the plurality of first conveyors at each intersection between the second conveyor and the plurality of first conveyors; and
    means adjacent each intersection for transferring at least one article between the first and second conveyors.

11. The system according to claim 10, wherein the transferring means is a transfer conveyor.

12. The system according to claim 10, wherein the transfer conveyor is L-shaped and includes a first portion aligned with the first conveyor and a second portion aligned with the second conveyor.

13. The system according to claim 12, wherein the second portion is tilted relative to a horizontal plane such that articles may slide onto the second conveyor.

14. The system according to claim 10, wherein the transferring means is selected from the group consisting of an active conveyor, a passive chute, and an elevator.

15. The system according to claim 10, wherein the second conveyor is positioned below the plurality of first conveyors.

16. The system according to claim 10, wherein the second conveyor is positioned above the plurality of first conveyors.

17. The system according to claim 10, further including means for moving the at least one article from the first conveyor to the transferring means.

18. The system according to claim 17, wherein the moving means is a diverter associated with the first conveyor.

19. The system according to claim 10, wherein the first conveyors comprise endless belt or chain conveyors.

20. The conveyor system of claim 10, wherein each of the first and second conveyors comprises a linear conveyor having a starting point at one end and an end point at a second end.

21. The conveyor system of claim 10, wherein each first conveyor overlaps the second conveyor only one time.

22. The system according to claim 10, wherein the second conveyor includes a movable section that, in a home condition, at least partially overlies at least one of the first conveyors and spans between two adjacent sections of the second conveyor.

23. A conveyor system for intended use in conjunction with the sorting of articles, comprising:
    a plurality of first conveyors extending in a first direction;
    a plurality of second conveyors overlapping the first conveyors; and a third conveyor for transferring articles from a first conveyor to a second conveyor at each intersection, wherein the third conveyor is L-shaped and includes a first portion aligned with the first conveyor and a second portion aligned with the second conveyor.

24. The system according to claim 23, wherein the second portion is tilted relative to a horizontal plane such that articles may slide onto the second conveyor.

25. A conveyor system for intended use in conjunction with the sorting of articles, comprising:
- a plurality of first substantially continuous endless belt or chain conveyors extending in a first direction, each providing a first conveying surface for the articles;
- a plurality of second substantially continuous endless belt or chain conveyors extending in a second direction and intersecting the first conveyors, each second conveyor providing a second conveying surface for any articles transferred from one or more of the intersecting first conveyors; and
- means for transferring at least one article from at least one of the first conveyors to an intersecting one of the second conveyors.

26. The system according to claim 25, wherein the belts or chains of the first conveyors include conveying surfaces having longitudinal dimensions that are parallel to each other and generally perpendicular to the longitudinal dimensions of the conveying surfaces of the belts or chains of the second conveyors.

27. The system according to claim 25, wherein a longitudinal dimension of the first conveying surface of at least one first conveyor extends generally perpendicular to a longitudinal dimension of the second conveying surface of at least one second conveyor.

28. The system according to claim 25, wherein the first and second conveyors are chain conveyors including interconnected modular links.

29. The system according to claim 25, further including a plurality of third conveyors for receiving articles from the first or second conveyors, wherein the third conveyors intersect the first conveyors and extend generally parallel to the second conveyors.

30. The system according to claim 29, wherein the third conveyors move the articles in a direction generally opposite that of the second conveyors.

* * * * *